(12) United States Patent
Biba et al.

(10) Patent No.: US 8,103,379 B2
(45) Date of Patent: Jan. 24, 2012

(54) MEDICATION CABINETRY

(75) Inventors: Scott I. Biba, Highland, WI (US);
Randall S. Koplin, Fitchburg, WI (US);
Daniel J. Lee, Monticello, WI (US);
Kathy L. Soukup, Downers Grove, IL (US); James A. Michael, Cranberry Township, PA (US)

(73) Assignee: AutoMed Technologies, Inc., Buffalo Grove, IL (US)

( * ) Notice: Subject to any disclaimer, the term of this patent is extended or adjusted under 35 U.S.C. 154(b) by 399 days.

(21) Appl. No.: 12/351,679

(22) Filed: Jan. 9, 2009

(65) Prior Publication Data

US 2010/0176699 A1 Jul. 15, 2010

(51) Int. Cl.
*G06F 17/00* (2006.01)

(52) U.S. Cl. ........ 700/243; 700/242; 700/232; 700/241; 221/199; 312/319.1

(58) Field of Classification Search .................. 700/231, 700/232, 237, 241–243; 221/199; 312/319.1
See application file for complete search history.

(56) References Cited

U.S. PATENT DOCUMENTS

| | | | |
|---|---|---|---|
| 3,682,113 A * | 8/1972 | McClellan et al. | 109/19 |
| 4,267,942 A | 5/1981 | Wick, Jr. et al. | |
| 4,785,969 A | 11/1988 | McLaughlin | |
| 4,865,404 A | 9/1989 | Harper | |
| 4,927,051 A | 5/1990 | Falk et al. | |
| 5,014,875 A | 5/1991 | McLaughlin et al. | |
| 5,222,789 A * | 6/1993 | Yoshikawa | 312/270.3 |
| 5,255,971 A | 10/1993 | Aisley | |
| 5,377,864 A | 1/1995 | Blechl et al. | |
| 5,405,048 A | 4/1995 | Rogers et al. | |
| 5,460,294 A | 10/1995 | Williams | |
| 5,745,366 A | 4/1998 | Higham et al. | |
| 5,805,456 A | 9/1998 | Higham et al. | |
| 5,905,653 A | 5/1999 | Higham et al. | |
| 5,927,540 A * | 7/1999 | Godlewski | 221/2 |
| 6,011,999 A | 1/2000 | Holmes | |
| 6,109,774 A | 8/2000 | Holmes et al. | |
| 6,116,461 A | 9/2000 | Broadfield et al. | |
| 6,151,536 A | 11/2000 | Arnold et al. | |

(Continued)

FOREIGN PATENT DOCUMENTS

JP 2001-275766 A 10/2001

OTHER PUBLICATIONS

International Search Report and Written Opinion for International Application No. PCT/US2009/069432, mail date Aug. 27, 2010, 6 pages.

*Primary Examiner* — Michael K Collins

(74) *Attorney, Agent, or Firm* — Reinhart Boerner Van Deuren s.c.

(57) ABSTRACT

An exemplary embodiment includes a cabinet having at least one drawer with selectable access for storing items, such as medications. A slidable cover with a first opening allows for closure and/or access to items in an interior of the drawer. The cabinet further includes an actuator coupled to the cover and a controller coupled to the actuator to control movement of the first opening relative to the drawer interior in response to signals generated from a user interface.

12 Claims, 7 Drawing Sheets

U.S. PATENT DOCUMENTS

| | | |
|---|---|---|
| 6,170,929 B1 | 1/2001 | Wilson et al. |
| 6,175,779 B1 | 1/2001 | Barrett |
| 6,338,007 B1 | 1/2002 | Broadfield et al. |
| 6,401,991 B1 | 6/2002 | Eannone |
| 6,427,865 B1 | 8/2002 | Stillwell et al. |
| 6,594,549 B2 | 7/2003 | Siegel |
| 6,609,047 B1 | 8/2003 | Lipps |
| 6,662,081 B1 | 12/2003 | Jacober et al. |
| 6,760,643 B2 | 7/2004 | Lipps |
| 6,785,589 B2 | 8/2004 | Eggenberger et al. |
| 6,847,861 B2 | 1/2005 | Lunak et al. |
| 6,975,922 B2 | 12/2005 | Duncan et al. |
| 6,996,455 B2 | 2/2006 | Eggenberger et al. |
| 6,997,377 B2 * | 2/2006 | Washington et al. ......... 235/379 |
| 7,010,389 B2 | 3/2006 | Lanak et al. |
| 7,040,504 B2 | 5/2006 | Broadfield et al. |
| 7,072,737 B2 | 7/2006 | Lunak et al. |
| 7,228,200 B2 | 6/2007 | Baker et al. |
| 7,293,672 B2 | 11/2007 | Mori et al. |
| 7,293,673 B2 | 11/2007 | Savage et al. |
| 7,395,945 B2 | 7/2008 | Godlewski |
| 7,434,704 B2 | 10/2008 | Yuyama et al. |
| 7,464,832 B2 * | 12/2008 | Lee ................................ 221/12 |
| 7,502,666 B2 | 3/2009 | Siegel et al. |
| 7,848,846 B2 * | 12/2010 | Uema et al. ................... 700/243 |
| 2001/0019065 A1 | 9/2001 | William et al. |
| 2001/0044731 A1 | 11/2001 | Coffman et al. |
| 2004/0026442 A1 | 2/2004 | Hutchinson |
| 2004/0134043 A1 | 7/2004 | Uema et al. |
| 2004/0158350 A1 * | 8/2004 | Ostergaard et al. ........... 700/231 |
| 2005/0145644 A1 | 7/2005 | Mori et al. |
| 2006/0079994 A1 | 4/2006 | Chu et al. |
| 2006/0151517 A1 * | 7/2006 | Varis .............................. 221/48 |
| 2006/0197419 A1 * | 9/2006 | Sorensen ...................... 312/245 |
| 2007/0023193 A1 | 2/2007 | King |
| 2007/0078562 A1 | 4/2007 | Park, IV |
| 2007/0262147 A1 | 11/2007 | Braun et al. |
| 2008/0065264 A1 | 3/2008 | Omura et al. |
| 2008/0129171 A1 | 6/2008 | Greiner |
| 2009/0015116 A1 | 1/2009 | Arceta et al. |
| 2009/0055018 A1 | 2/2009 | Meek, Jr. et al. |
| 2009/0108016 A1 | 4/2009 | Brown et al. |
| 2009/0114672 A1 | 5/2009 | Schifman et al. |
| 2009/0138122 A1 | 5/2009 | Wagner |

\* cited by examiner

MEDICATION CABINETRY

BACKGROUND OF THE INVENTION

The subject matter described herein relates generally to the field of cabinetry. In particular, the subject matter described herein relates to the medication cabinetry to securely store and/or controllably distribute medical items, instruments, articles, products, and the like.

SUMMARY OF THE INVENTION

One embodiment of the invention relates to a drawer assembly having at least one drawer with selectable access. The drawer assembly includes at least one drawer housing, and a drawer unit slidable therein. The drawer unit includes walls defining an interior, and a belt moveable relative to the drawer unit such that the belt provides a closure for the drawer unit. An opening in the belt provides access to a portion of the drawer unit interior. An electric actuator is coupled to the belt and a controller coupled to the actuator provides for controlled movement of the opening relative to the drawer interior in response to signals generated from a user interface.

Another embodiment of the invention relates to a cabinet having at least one drawer with selectable access. The cabinet includes at least one drawer housing, and a drawer unit slidable therein. The drawer unit includes walls defining an interior, and a cover slidable relative to the drawer unit such that the cover provides a closure for the drawer unit. The cover flexibly bends about a portion of the drawer unit, and an opening in the cover provides access to a portion of the drawer interior. An electric actuator is coupled to the cover and a controller coupled to the actuator provides for controlled movement of the opening relative to the drawer interior in response to signals generated from a user interface.

Yet another embodiment of the invention relates to an automated dispensing system. The system includes a cabinet which itself includes at least one drawer housing, and a drawer unit slidable therein with walls defining an interior. The cabinet also includes a flexibly bendable cover moveable relative to the drawer unit such that the cover provides a closure for the drawer unit. An opening in the cover provides access to a portion of the drawer interior. The system also includes an electric actuator coupled to the cover, a controller coupled to the actuator, and a user control interface coupled to the controller. The controller includes an electronic memory that holds access authorization information, cabinet contents information, and medical patient information. Signals generated from the controller allow a user to control the actuator which moves the opening relative to the drawer interior.

DETAILED DESCRIPTION OF THE PREFERRED EMBODIMENTS

Medical items, such as medications, medical instruments and applicators, may require controlled-access storage to inhibit misuse, mistake, or theft. As such, doctors, nurses, technicians, pharmacists, and the like, may utilize medication cabinetry specifically designed to securely store and/or controllably distribute medical items, instruments, articles, products, and the like. A preferred embodiment of the present invention provides storage for which to securely store such items, where the cabinetry provides selectable access to the contents of drawers. While certain preferred embodiments of the invention may be specifically intended for use with medication cabinetry, it should be noted that the claimed technology can also be used in a variety of other secured-storage applications, such as by jewelers storing jewelry, weapons magazine operators storing ammunition, chemists storing chemicals, bankers storing contents of safe deposit boxes, and the like.

Figure 1:
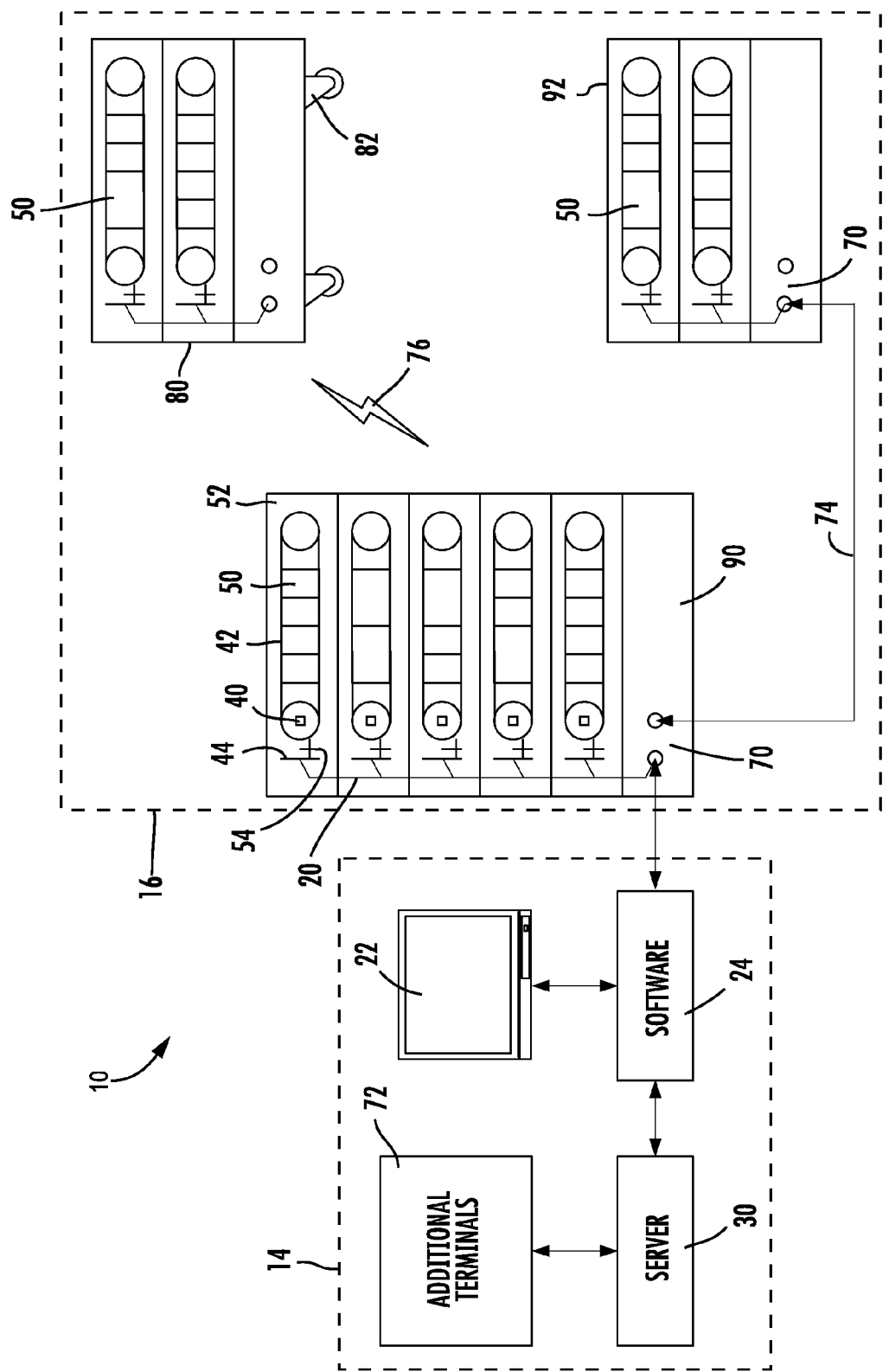
FIG. 1 is a diagram of an item management system according to one invention.

FIG. 1 presents a diagram of an exemplary embodiment of an item management system 10 (also called a dispensing station). Such a system 10 may, for example, serve as a controlled-access medication system. The system 10 includes an electronic control system 14 that is coupled to a cabinet hardware 16. The system 10 allows a system user to interact with the cabinet hardware 16 through the electronic control system 14. For example, an authorized user may direct the electronic control system 14 to release locks in the cabinet hardware 16, such that contents stored within the cabinetry 16 may be accessed by the authorized user.

The control system 14 in FIG. 1 further includes a number of components coupled to a controller 20, such as a user interface 22 (also called a terminal), a software 24 with a memory. The user interface 22 relays information signals between a user and controller 20. The software 24 provides ordered logical algorithms used by the controller 20 to interact with the user, the memory, and the hardware 16. Through the control system 14, the user may manipulate portions of the cabinet hardware 16.

The memory stores data in various databases on a server 30 (or hard drives, disks, and/or the like), including for example a cabinetry-contents information database, an authorization information database, and a client or patient information database. One exemplary control system embodiment includes a network of hospital computers, linked to medical patient-related data, medication cabinetry-contents data, and medical personnel authorization data. A user may access, add to, take from, and/or augment the data in the memory. However, other embodiments may not include a memory with databases related to contents, authorization, and/or client information.

The cabinet hardware 16 in FIG. 1 further includes a drawer unit 50, a drawer housing 52, a latch 54, and an actuator 40 coupled to both a movable access portion 42 of the drawer unit 50, and a sensor 44. One exemplary movable access portion is a belt with an access opening, wherein the belt is slidable about the drawer unit 50. Another exemplary movable access portion is a flexible cover that bends about the drawer unit, wherein the cover has an opening. The cover flexibly bends in that it is actively bendable, as opposed to fixedly or rigidly bent. When the movable access portion 42 is in a closed position (e.g., an opening in the movable access portion is not aligned to access the drawer unit's interior), then the system 10 may prevent access to stored items, such as medication. Cabinets 90, 92 are both forms of stationary cabinetry, while cabinet 80 is movable on casters 82. The control system 14 and cabinets 90, 92 are in wired communication through ports 70. Information is relayed to cabinet 92 through cabinet 90 in a "daisy chain" linkage 74. The control system 14 communicates with cabinet 80 through wireless communication 76. Additional terminals 72 may also be connected to the server 30.

However upon instruction, control signals from the controller 20 induce the actuator 40 to move the access portion 42 relative to the drawer unit 50, from the closed position into an open position. Sensory data signals from the sensor 44 may then allow the controller 20 to detect the position and/or orientation of the access portion with respect to the drawer unit 50.

Additionally, the latch 54 holds the drawer unit 50 fully within the drawer housing 52 (i.e., holds the drawer closed), such that a user could not access items within the drawer unit 50 even if the movable access portion 42 was in the open position. However, upon instruction, signals from the controller 20 induce the latch 52 to release the drawer unit 50, allowing the drawer unit 50 to slide partially out of the drawer housing 52 by the user. With both the drawer unit 50 slid out of the drawer housing 52 and the movable access portion 42 in the open position, the user has access to the selected items.

Figure 2:
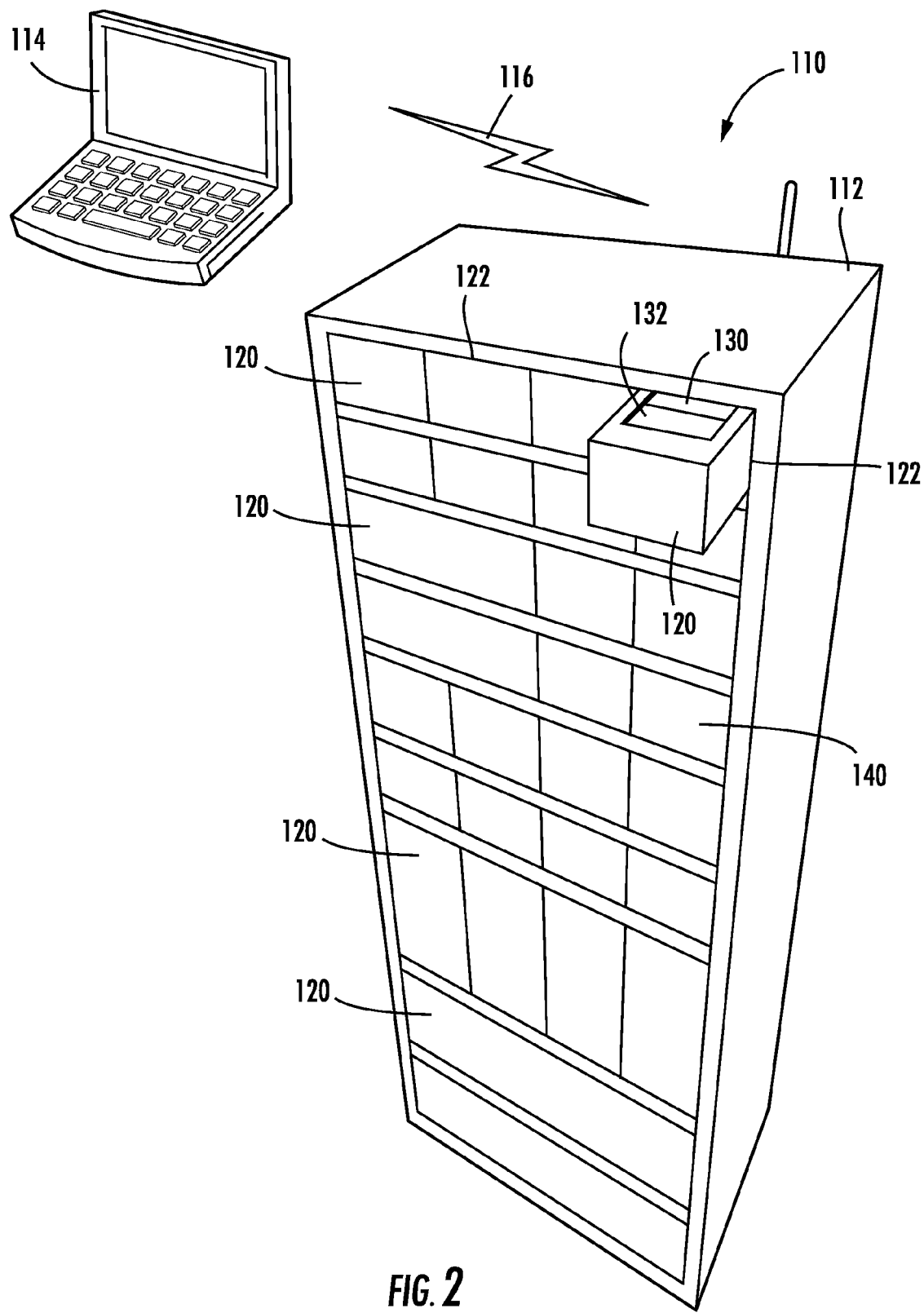
FIG. 2 is a perspective view of an access-controlled cabinetry system according to one invention.

FIG. 2 presents an access-controlled cabinetry system 110, including a cabinetry 112 that is coupled (wireless or hardwired) to a controller 114 via electronic signaling. Cabinetry 110 includes a plurality drawer housings 122 sized to hold a plurality of drawer units 120. The drawer units 120 may slide within the drawer housings 122, such that an authorized user may access the contents of a drawer unit by sliding the drawer unit within the drawer housing to expose an access portion 132 of the drawer unit. In an exemplary embodiment, the controller 114 may emit electronic signals 116 to direct an actuator within the cabinetry 112 to adjust a movable cover 130 on a drawer unit 120 and/or to release a latch binding the drawer unit 120 to the drawer housing 122. For example, a nurse may then slide the drawer unit 120 partially out of the cabinetry drawer housing 122 and then reach into the interior of the drawer unit 120 through the access portion 132 to retrieve a medication item.

The cabinetry 112 in the system 110 embodiment of FIG. 2 shows individual drawer units 120 and drawer housings 122 in a variety of sizes. In other embodiments, all drawer units and drawer housings are of a uniform size and shape, such that the drawer units are interchangeable within a cabinetry. The drawer units 120 in the system 110 are box-shaped. In other embodiments, some drawer units are cylindrical, cubical, hexagonal in cross-section, or other shapes.

The controller 114 in the FIG. 2 system 110 embodiment is a stand-alone laptop computer. The laptop contains software and memory dedicated to the operation of the cabinetry 112. Other controller embodiments include personal computers, computers physically joined to the cabinetry, wireless remote controls (similar to typical television remote controls), hard-wired remote controls, data entry ports, control circuitry, circuit boards, and the like. Instructions from a user via the controller 114 to the cabinetry 112 may direct a drawer unit 120 to position its cover 130 to allow access to contents stored in compartments within the interior of the drawer unit 120. Additional instructions from the user via the controller 114 to the cabinetry 112 may direct a latch to release an individual drawer unit 120, such that the drawer unit 120 may be free to slide within a drawer housing 122 in the cabinetry. In other embodiments, a controller may only control access to a subset of drawer units in a cabinetry. For example, a first controller may control access to a first subset of drawers; a second controller may control access to an overlapping, but larger second subset of drawers; and still third subset of drawers may not be affected by either controller.

Figure 3:
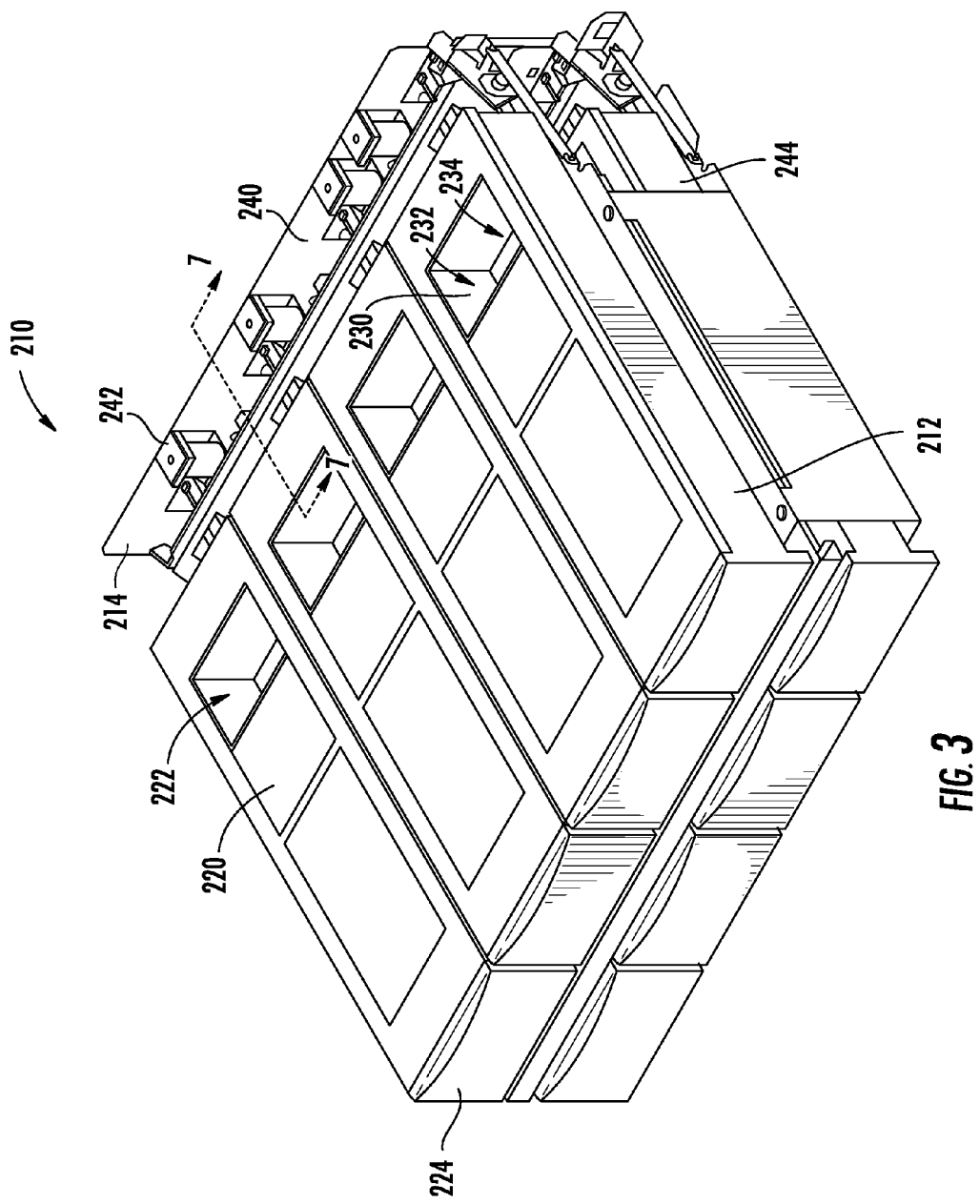
FIG. 3 is a perspective view of a drawer assembly according to one invention.

FIG. 3 shows a drawer assembly 210 of drawer units 212 attached to a back wall 214 of cabinetry, where the drawer assembly 210 is analogous to a row 140 shown in the cabinetry 112 of FIG. 2. The drawer assembly 210 in FIG. 3 includes eight drawer units 212 of uniform size and shape in two rows (or four columns), where each drawer unit 212 includes a face 224 and a slidable cover 220 with an opening 222. The drawer unit 212 further includes a plurality of walls 230 that form a drawer unit interior 232 with individual compartments 234. In some embodiments, the cover 220 may only be controllably slid when the drawer unit 212 is fully in a drawer housing. Upon sliding the drawer unit 212 from the drawer housing, spring-loaded connection pins separate drawer unit connectivity from the back wall 214 and electrical power is cut to an actuator attached to the cover 220. In other embodiments, electrical power is not cut, but a signal directs the actuator not to slide the cover 220. In some cabinetry embodiments, the drawer assembly in FIG. 3 may be retrofit and inserted in place of an older drawer assembly.

The cover 220 forms a closure over the drawer unit interior compartments 234, such that the cover 220 may block a user trying to reach the contents of a first compartment (not shown, because it would be beneath the cover 220 in FIG. 3). At the same time, the opening 222 of the cover may allow the user access to a second compartment 234. The cover 220 then can be slid by an actuator, repositioning the cover's opening 222 to instead allow access to the first compartment and form a closure with the second compartment. In other positions, the cover 220 may form a closure with both openings.

The back wall 214 includes circuitry board 240 (also called firmware, e.g., PROM) and a latch actuator 242 (e.g., a solenoid; motor with a pulley; mating electromagnets biased apart; and the like), both coupled to a controller that is analogous to the controller 114 in FIG. 2. The drawer unit 212 may slide along a slide rail 244 that extends from the back wall 214, to slide relative to a drawer housing. However a latch attached to the back wall 214 may prohibit such sliding when the drawer unit is locked within a drawer housing (i.e., the latch may hold the drawer closed). The latch actuator 242 may then release the latch when directed by the controller. The back wall 214 may also include an interlock (e.g., a switch, spring pin connection, and the like) that can break electronic communication between the controller and the drawer unit 212 when the drawer unit 212 is partially slid outside a drawer housing such that a substantial portion of the drawer unit 212 is not located within the drawer housing. The portion is "substantial" when an unauthorized user could grip and pull the drawer unit 212 and/or cover in order to force access to interior compartments 234.

Figure 4:
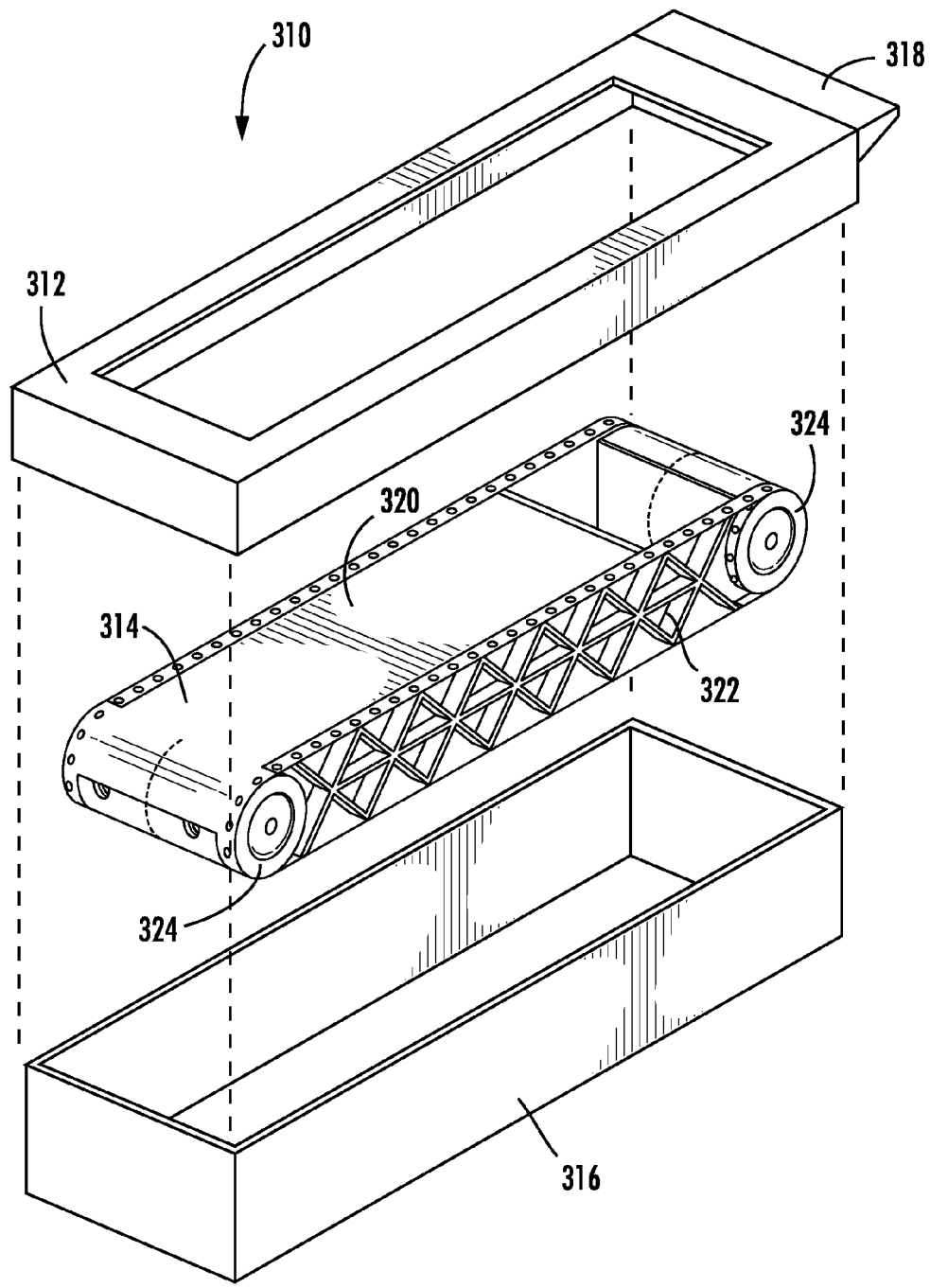
FIG. 4 is an exploded, perspective view of a drawer unit according to one invention.

FIG. 4 shows an exploded view of a drawer unit 310, including three components: a drawer top frame 312 (also called a shell cover), a controllable insert 314, and a drawer shell 316 (also called a drawer body). The insert 314 fits primarily within the shell 316, and the frame with flanges fits over the top of the insert 314 and attaches to the shell 316 in order to prevent removal of the insert from the shell 316. In some embodiments, the frame 312 can be tightened to the shell 316 by means of turning a thumb screw. The drawer shell 316 is sized to fit within a drawer housing, in a manner analogous to the drawer unit 120 and drawer housing 122 in FIG. 2. The insert 314 includes a slidable cover 320, a sidewall 322, and a pair of rollers 324. The cover 320 may slide relative to the drawer unit 310 (i.e., components of the drawer unit other than the cover 320). In some embodiments, the insert 314 includes intermediary flanges extending from the insert sidewall 322 to contact the shell 316 in order to separate the insert cover 320 from contact with the shell 316. In other embodiments intermediary flanges extend from the shell.

Figure 5:
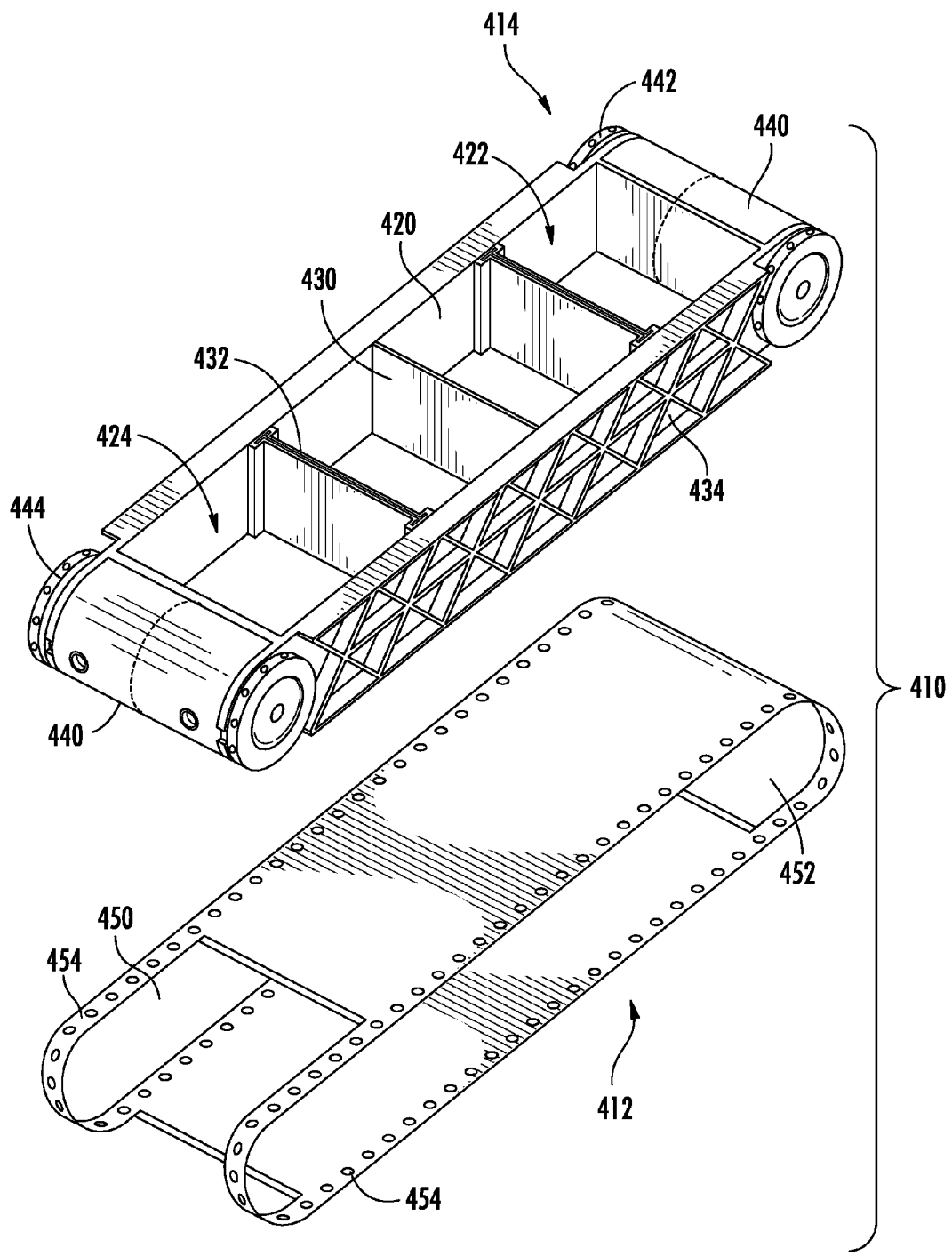
FIG. 5 is an exploded, perspective view of a controllable insert according to one invention.

FIG. 5 shows an exploded, perspective view of a controllable insert 410, including two components: a belt 412 and an insert body 414. The body 414 includes a plurality of walls, such as dividers 430, 432, and side walls 420, that together form an interior 422 of the body with four compartments 424. Items may be stored in the compartments 424. Each longitudinal end 440 of the insert 414 includes a roller 440, where the roller 440 is in the form of a sprocket 442 with teeth 444 that are attached to the sides of each roller 440. Additionally, the belt 412 includes two perforated tracks 454, one on each transverse side of the belt 412. The belt 412 is sized to fit around the insert 414, such that rotation of the sprockets 442, with the teeth 444 tracking the belt 412 perforations, causes the belt 412 to slide relative to the compartments 424. The belt 412 includes two openings, a larger opening 450 and a smaller opening 452.

In the insert 410 embodiment, some of the dividers 430, 432 are fixed dividers 430 while other dividers are removable dividers 432 providing an optional wall. Fixed dividers 430 may be injection molded with the insert body 414, glued, welded, etc. to the body 414. Removable dividers 432 may be taken out of the insert 410 interior 422 in order to produce a larger compartment (e.g., a compartment formed when a divider 432 is removed). The larger opening 450 is sized to fit a larger compartment 424, while the smaller opening 452 is sized to fit a smaller compartment 424. For example, the insert 414 can have either two, three, or four compartments 424, depending upon the use or removal of the removable inserts 432.

While the FIG. 5 embodiment shows four compartments 424, other insert body embodiments include fewer or greater numbers of compartments. For example, variant embodiment insert bodies have ranges of one to a thousand compartments (e.g., for a long insert with single item access to one-thousand small items), but preferably between one and ten compartments, and even more preferably between one and four compartments, such as the four-compartmented embodiment insert body 410 shown in FIG. 5. Also, in the insert 410 embodiment the walls 420 form compartments 424, each with an open side. However, in other embodiments, some compartments may include a lid. Some lids may be attached to a wall by a hinge, while other lids may be completely separable from the walls. When the slidable cover (or belt) positions an opening over the lid, the lid may be lifted allowing access to the contents of the compartment.

Also shown in FIG. 5 is the belt 412, which in some embodiments may be an indexing belt and/or a shutter. The belt 412 is made of a continuous material, such as about a 0.125 millimeter (or 0.005 inch) thick stainless steel sheet. Other embodiments include belts of a thicker clear mylar or polycarbonate sheet. Some embodiments include belts made from links, similar to the treads of a tank or the bands of some metal watches. The covers are preferably made to be flexible, such that they may bend about a portion of the insert, such as a roller. Bending of the cover allows for a more-compact design, because the unused portions of the cover may be stored beneath or inside the insert, instead of jutting out from the insert. In some embodiments, belts are sized to be much larger than the periphery of the insert, such that an excess length of belt is stretched back and forth beneath the insert via a series of rollers (much like a rope would extend back and forth in a pulley system or a block and tackle). The excess length of belt allows for additional openings of various sizes. Still other embodiments include flexible covers that are not belts. For example, some embodiments include rollers that are spools that wind the cover within or around the spool. Such covers are straps, strips, bands, and the like, and do not slide completely around the insert. Some embodiment covers form openings with reinforced cross edges, such as a folded-over stainless steel cover. The reinforcement can prevent sharp opening edges and help prevent unauthorized "fishing" between compartments, where a user has access to one compartment but then "fishes" by lifting the belt to reach items in an adjacent compartment.

The sprockets 442 in FIG. 5 include teeth 444 for gripping the perforated belt track. Some embodiments include sprockets 442 injection molded from Celcon or Delrin materials, while other embodiments are cast or molded metals and composites. In other embodiments, the sprocket surfaces have a high-friction surface, such as sandpaper grit or a gripping rubber, for providing the sliding force on the belt (or other cover) without teeth. Still other embodiments included rollers that are bearings, bushings, ball bearings, wheels, cogs, cogwheels, and the like. Other embodiments include fixed rollers, such as rounded and/or lower-friction surfaces, such as a rounded Teflon-coated end. The use of teeth has some advantages, because the teeth may prevent misuse of the drawer unit by an unauthorized user pulling the cover to move a cover opening over a desired compartment. However, the same benefit may be achieved by adding a lock to the belt, such as a locking member that engages a belt perforation when the drawer unit is slid from its drawer housing, such as a spring latch. Some embodiments do not use rollers to impart a sliding force on the cover, but instead use mechanical arms with hooks attached the sides of the belt. The mechanical arms are actuated by electromagnets that pull or push the arms and/or solenoids (i.e., forms of electric actuator), causing the cover to slide relative to the compartments. Such embodiments may also use wheels, bearings, sprockets, and the like in conjunction with the arms. In some embodiments, the controller can drive the actuator in two directions (i.e., bi-directional movement). Bi-directional movement of the cover may allow for faster positioning of a cover opening than uni-directional sliding.

Figure 6:
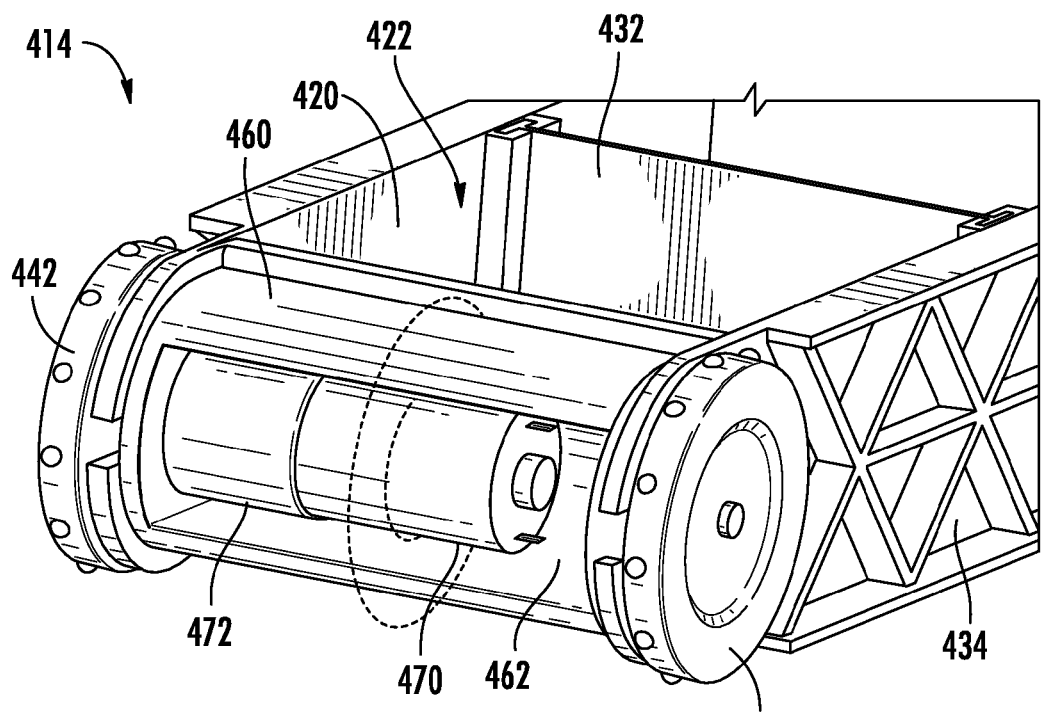
FIG. 6 is a perspective view of a first end of the controllable insert in FIG. 5 according to one invention.

FIG. 6 shows a perspective view of a first end of the controllable insert 414, including sidewalls 434 and removable divider 432 forming an interior 422, two sprockets 442, and an end surface 460 (that was not shown in FIG. 5 because it would have been beneath the end covers 440). The end surface forms a motor box 462 in which a DC motor 470 and gearing 472 are positioned. The DC motor 470 is coupled to the gearing 472 by a motor shaft (not shown), and the gearing 472 is coupled to a sprocket 442. The motor 470 is also coupled to a controller, and the motor performs as an actuator under the direction of the controller to drive the sprocket, which pushes or pulls the cover 440. Third, the motor 470 is coupled to a power source. Such a source could be an internal battery; a series of copper leads running through the insert connected to an outside source, such as an outlet; or the like. It should be recalled that an arm connected to an electromagnet could also be an actuator to push or pull the belt, as discussed above. In some embodiments, the gearing 472 is in the form of a high-reduction gear box that resists movement when not actuated, which may help to prevent unauthorized users from being able to manually force the cover open.

Figure 7:
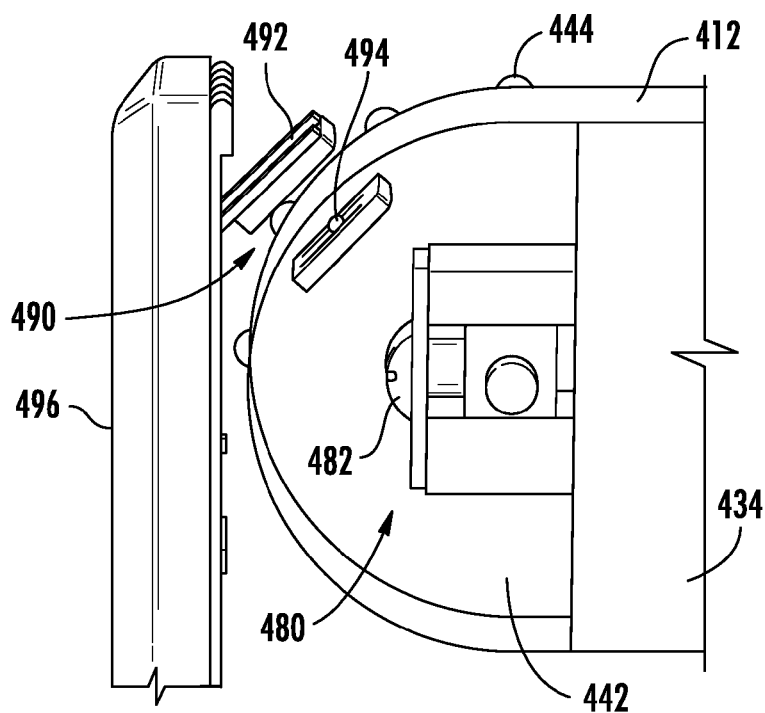
FIG. 7 is a side view of a second end of the controllable insert in FIG. 5 according to one invention.

FIG. 7 shows a side cross-sectional view (as indicated in FIG. 3) of a second side of the controllable insert 414, including, a belt 412 (or other cover), a sprocket 442 with teeth 444, and a side wall 434. Also present in FIG. 7 is a belt tensioning assembly 480 with tighteners 482 and a sensor assembly 490, which includes an optical sensor 492 attached to the back wall 496 on one side of the belt 412 and a light source 494 on the other side of the belt. The tensioning assembly 480 allows for removal and tensioning of the belt 412 on the insert 414. The sensor assembly provides belt 412 orientation information to a controller, so that the controller may operate a motor (or other actuator) in relation to a current and/or desired orientation of the belt 412 and a belt opening.

The embodiment of FIG. 7 shows a form of tensioning assembly 480. Tighteners 482 (e.g., screws; crisscrossing arms, i.e. similar to a jack to raise a car's chassis for repairing tires; a pulley system; and the like) can be tightened or loosed to push the sprockets 442 (or an entire insert 414 end) closer or further from the controllable insert 414 center. For example, actuating the tighteners 482 pushes the sprockets 442 further from the center of the insert 414, thus adding tension to the belt (or other cover). A belt 412 with greater tension may help to prevent "fishing" between compartments. Tension in the belt also may help the sprocket 442 and teeth 444 to engage and grip the belt 412. Other embodiment tensioning assemblies include springs in place of tighteners, where the sprockets must be manually pushed toward the center of the insert in order to fit the belt onto the insert. Then, when the belt is in position, the sprockets can be released and the springs add tension to the belt through the sprockets. Still other embodiment tensioning assemblies include automated tighteners, where a controller directs an actuator to drive the sprockets or insert ends to add tension to the belt.

The embodiment of FIG. 7 shows a form of sensor assembly 490 that provides belt position information to the controller. In one embodiment, light passes from the light source 494 (e.g., light-emitting diodes, bulbs, etc.) through evenly-spaced perforations or apertures in the belt to the light sensor 492. The controller, then counts the number of perforations detected by the sensor 492 to determine the relative position of the belt 412. In other embodiments, the belt includes a series of small holes that are in coded sequences. The coded sequence varies at different positions on the belt, such that detection of the coded sequence by the sensor provides positional information to a controller. Still other embodiments do not include an optical sensor for detecting belt position. For example, at least one embodiment counts the rotations of the sprockets, and determines the orientation of the belt relative to a starting position (e.g., "counting teeth" of the sprocket).

Figure 8:
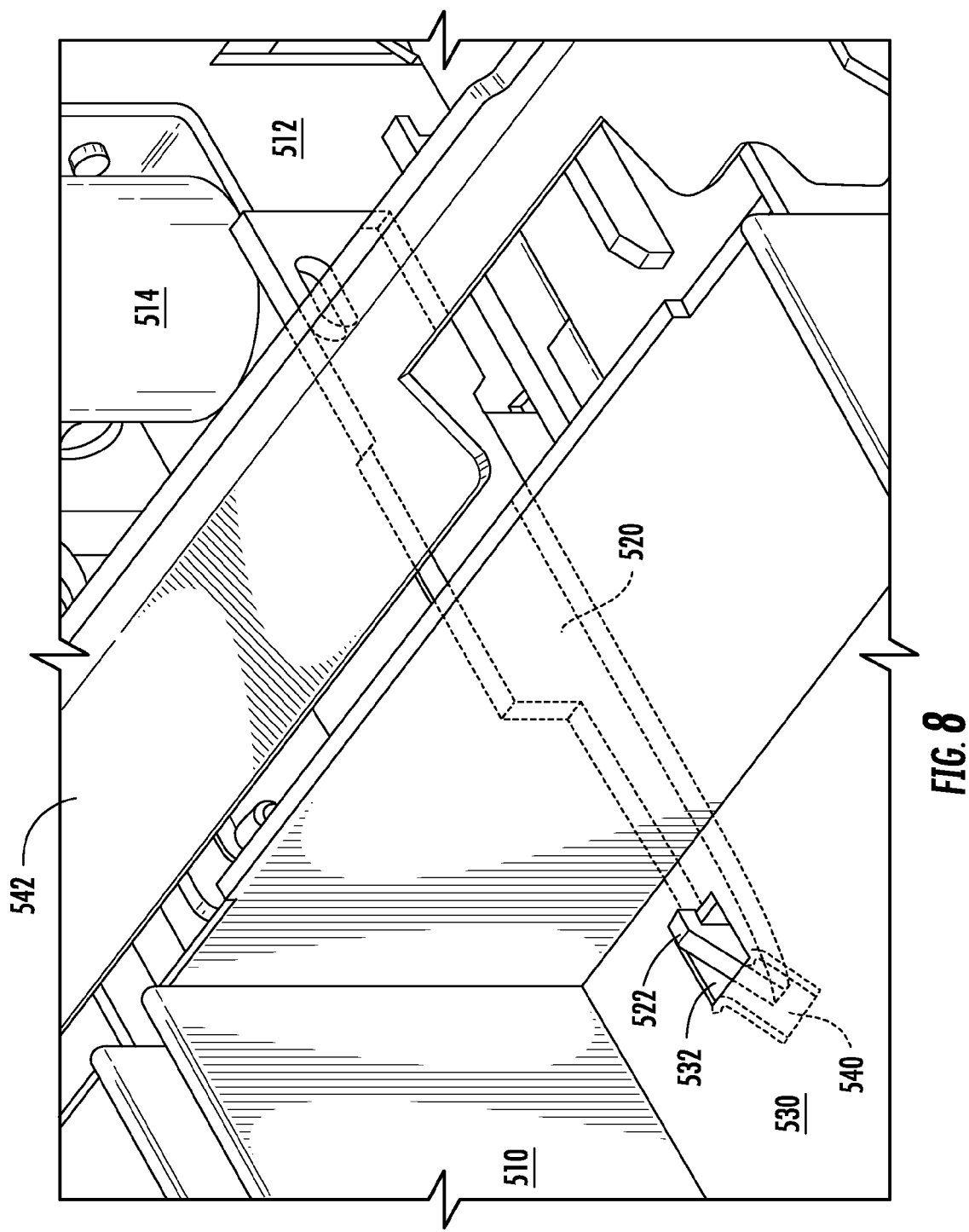
FIG. 8 is an inside perspective view of a shell and latch according to one invention.

FIG. 8 shows an inside perspective view of a shell 510 coupled to the back wall 512 of a cabinetry. A latch arm 520 is positioned beneath the bottom wall 530 of the shell 510 and a latch head 522 connects to the shell 510 through a gripping hole 532 (also called an internal strike) formed within the shell floor 530. In some embodiments the internal strike 532 is reinforced, such as with an overlapping metal border fixed to the shell floor 530. In other embodiments, the latch connects to a strike coupled to the outside of the shell. The latch arm 520 is coupled a latch actuator 514 that can be directed by a controller to release the latch, i.e. remove the latch head 522 from the hole 532. Additionally the latch arm 520 is attached to a spring or other biasing member and automatically engages the shell 510 when the shell gripping hole 532 is placed over the latch head 522. The latch may help prevent an unauthorized user from being able to slide a drawer unit within a drawer housing of a controlled-access cabinetry. However, after an authorized user has actuated the drawer unit cover to allow access to a compartment, the user may have the latch released via directions from the controller (i.e., the drawer unit unlocked from the cabinetry). Still other embodiments automatically unlock the drawer unit, without direct user instruction, when an authorized user may access the contents of the cabinetry. Present in FIG. 4 is a security deflection tab 310 (also called a "fishability bracket") to block misuse of the cabinetry by manipulating the latch from an above position, such as by drilling a hole in the top of a cabinet and reaching down through the hole with a rod to release the latch. FIG. 8 also shows a fishability bracket 540 extending downward from the gripping hole 532 to block fishing from the front of the cabinetry. Other embodiments include deflection tabs extending from the shell 510. FIG. 8 shows a manual release plate 542 to release the latch 520 manually from the outside of cabinetry with key, code, and/or the like, such as during a power outage or with a controller malfunction.

It should be noted that for the purposes of this disclosure that the term "coupled" means the joining of two members directly or indirectly to one another. Such joining may be stationary in nature or moveable in nature and/or such joining may allow for the flow of electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. In the context of the controller and actuator, coupling generally means coupling components in electric signal communication.

It is also important to note that the construction and arrangement of the elements of the cabinetry as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, the cabinetry may be used on a mobile cart with casters and an independent power supply (e.g., battery) such that it can be pushed by nurses to hospital rooms. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A drawer assembly having at least one drawer with selectable access, the drawer assembly comprising:
    at least one drawer housing;
    a belt having a first opening;
    a drawer unit which is slidable within the drawer housing, the drawer unit including walls defining an interior, wherein the belt is moveable relative to the drawer unit such that the belt provides a closure for the drawer unit, and the first opening provides access to a portion of the drawer interior;
    an electric actuator coupled to the belt; and a controller coupled to the actuator to control movement of the first opening relative to the drawer interior in response to signals generated from a user interface;
wherein the drawer unit further includes a roller supported at each end thereof, and the belt is moveably supported relative to the drawer unit by at least the rollers;
wherein the interior of the drawer is divided into a plurality of separate compartments, wherein each compartment is configured to store corresponding articles such as individual medications, unit of use medications or other items for medical use;
wherein the actuator is an electric motor coupled to one of the rollers to selectively move the first opening relative to the compartments in response to the controller;
wherein an interlock is coupled to the controller to prevent operation of the electric motor when a substantial portion of the drawer unit is not located within the drawer housing;
wherein the belt includes a second opening larger than the first opening, the compartments having sizes which correspond to the sizes of the first and second openings, and the controller is configured to actuate the electric motor to align the first and second openings with the compartments to permit selected access to the compartments.

2. The drawer assembly of claim 1, further comprising an optical sensor unit coupled to the controller, wherein the belt includes a plurality of selectively spaced apertures and the sensor unit is supported relative to the apertures to generate a sensor signal representative of a location of the first and second openings relative to the compartments.

3. The drawer assembly of claim 2, wherein the apertures are arranged in a coded sequence.

4. The drawer assembly of claim 1, further comprising an electric drawer latch coupled to the controller, wherein the drawer latch inhibits sliding of the drawer unit.

5. A cabinet having at least one drawer with selectable access, the cabinet comprising:
at least one drawer housing;
a cover having a first opening;
a drawer unit which is slidable within of the drawer housing, the drawer unit including walls defining an interior, wherein the cover is slidable relative to the drawer unit such that the cover provides a closure for the drawer unit, the first opening provides access to a portion of the drawer interior, and the cover flexibly bends about a portion of the drawer unit;
an electric actuator coupled to the cover; and
a controller coupled to the actuator to control movement of the first opening relative to the drawer interior in response to signals generated from a user interface;
wherein a roller is supported at an end of the drawer unit, and the cover is moveably supported relative to the drawer walls by the roller;
wherein the drawer interior is divided into a plurality of separate compartments, wherein each compartment is configured to store corresponding articles such as individual medications, unit of use medications or other items for medical use;
wherein an interlock is coupled to the controller to prevent operation of the electric actuator when a substantial portion of the drawer unit is not located within the drawer housing;
wherein the cover includes a second opening larger than the first opening, the compartments have sizes which correspond to the sizes of the first and second openings, and the controller is configured to direct the electric actuator to align the first and second openings with the compartments to permit selected access to the compartments.

6. The cabinet of claim 5, further comprising an electric drawer latch coupled to the controller, wherein drawer latch inhibits sliding of the drawer unit.

7. An automated dispensing system, comprising:
a cabinet including at least one drawer housing, a flexibly bendable cover having a first opening, a drawer unit that is slidable within the drawer housing, the drawer unit including walls defining an interior, wherein the cover is moveable relative to the drawer unit such that the cover provides a closure for the drawer unit, and the first opening provides access to a portion of the drawer interior;
an electric actuator coupled to the cover;
a controller coupled to the actuator, wherein the controller is also coupled to an electronic memory that holds access authorization information, cabinet contents information, and medical patient information; and
a user control interface coupled to the controller, wherein through signals generated from the controller a user controls the actuator which moves the first opening relative to the drawer interior;
wherein the cover comprises a belt and the actuator comprises a motor;
wherein the belt includes a second opening larger than the first opening and the drawer interior is divided into a plurality of separate compartments, wherein the compartments have sizes which correspond to the sizes of the first and second openings, and a user may direct the controller to actuate the motor to align the first and second openings with the compartments to permit selected access to the compartments.

8. The system of claim 7, further comprising an interlock between the drawer housing and the drawer unit to prevent operation of the electric motor when a substantial portion of the drawer unit is not located within the drawer housing.

9. The system of claim 8, further comprising an electric drawer latch coupled to the controller, wherein drawer latch prevents sliding of the drawer unit from fully within the drawer housing unless the a user has the controller direct the latch to release.

10. The cabinet of claim 9, further comprising an optical sensor unit coupled to the controller, wherein the belt includes a plurality of selectively spaced apertures and the sensor unit is supported relative to the apertures to generate a sensor signal representative of a location of the first and second openings relative to the compartments, and wherein the apertures are arranged in a coded sequence.

11. The system of claim 7, further comprising a battery and a set of casters, wherein the cabinetry are supported upon the casters and the battery powers the motor.

12. The system of claim 7, wherein the motor includes a forward mode and a reverse mode to drive the belt in a bi-directional manner.

* * * * *